N. Snow, Jr.
Steering.
N° 25,983. Patented Nov. 1, 1859.
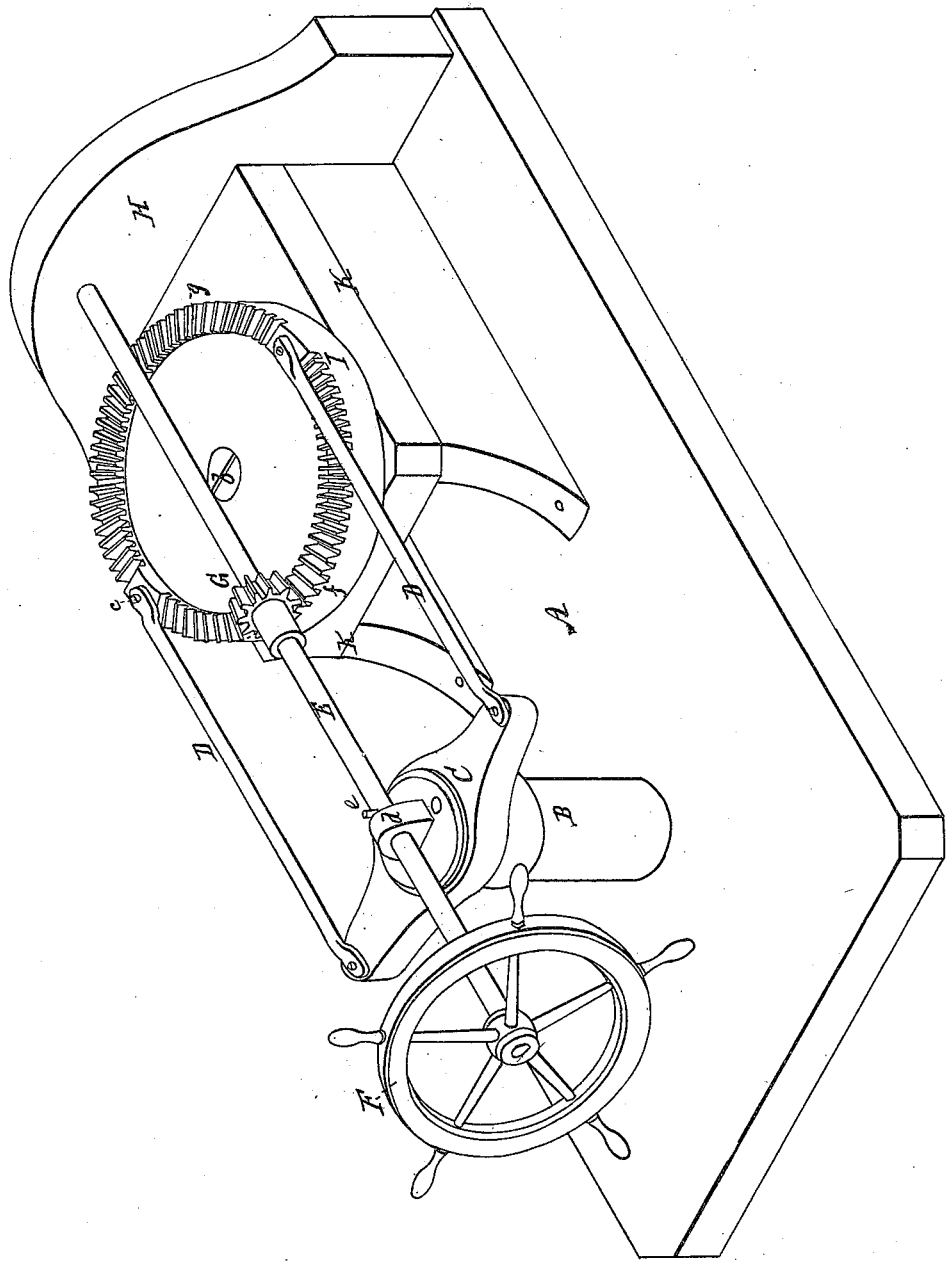
Witnesses
Thos. R. Roach
P. E. Tschemacher
Inventor
Nathaniel Snow Jr.

UNITED STATES PATENT OFFICE.

NATHANIEL SNOW, JR., OF BOSTON, MASSACHUSETTS.

STEERING APPARATUS.

Specification of Letters Patent No. 25,983, dated November 1, 1859.

*To all whom it may concern:*

Be it known that I, NATHANIEL SNOW, Jr., of Boston, in the county of Suffolk and State of Massachusetts, have invented an Improved Steering Apparatus, of which the following is a full, clear, and exact description, reference being had to the accompanying drawings, making part of this specification, in which is represented my improved "steerer" in perspective.

That others skilled in the art may understand and use my invention I will proceed to describe the manner in which I have carried out the same.

In the said drawing A represents the deck of a vessel, B the rudder head to which is attached a yoke C, to the end of each arm of which is pivoted a stout rod D. A knob $a$ is placed on top of the rudder head, the shank of this knob pivoting and swiveling around in the rudder head, it serves as one bearing for a shaft E, which carries the steering wheel F, and a pinion G; the other end of this shaft has its bearing in a heavy stanchion H, rising from the deck, or when convenient its bearing may be in the stern of the vessel itself. A heavy frame K secured on the deck serves as a support for a cog wheel I, which revolves horizontally around a shaft or screw $b$, passing through it into the frame K. The two rods D, are pivoted to stout bolts one on each side of the wheel I, at $c$. The pinion G engages with this wheel, so that as the wheel F, is turned the wheel I, is revolved, and through the connection of the rods D, the yoke C, is vibrated and the rudder turned in one direction or the other as required. A pin $e$, in the shaft E, immediately behind the knob $a$, prevents this shaft from working endwise so that the pinion G and wheel I, will be out of gear.

A great objection to this class of mechanical steerers has been that the breaking of a cog may disable the whole apparatus. But with the apparatus arranged as above, if a cog should be broken in the portion $f$ of the wheel I, which is now engaged with the pinion G, the rods D, can be lifted from their pivots $c$, and the wheel I, can be turned around so as to engage the pinion G with the portion $g$, when the rods can be replaced. A spare pinion may always be carried to provide for an accidental breaking of the teeth of the one in use.

What I claim as my invention and desire to secure by Letters Patent is—

The above described steering apparatus, consisting essentially of the wheel I, pinion G, rods D, and yoke C, arranged and operating substantially as described.

N. SNOW, JR.

Witnesses:
THOS. R. ROACH,
P. E. TESCHEMACHER.